(12) United States Patent
Gager et al.

(10) Patent No.: US 7,445,686 B2
(45) Date of Patent: Nov. 4, 2008

(54) METHOD FOR MAKING CUSHIONED PRODUCT WITH INTEGRAL COVER

(75) Inventors: Steven J. Gager, Holland, MI (US); Wesley D. Mersman, Holland, MI (US)

(73) Assignee: Royal Plastics, L.L.C., Hudsonville, MI (US)

( * ) Notice: Subject to any disclaimer, the term of this patent is extended or adjusted under 35 U.S.C. 154(b) by 409 days.

(21) Appl. No.: 11/324,888

(22) Filed: Jan. 4, 2006

(65) Prior Publication Data

US 2007/0151656 A1 Jul. 5, 2007

(51) Int. Cl.
*B32B 37/00* (2006.01)
(52) U.S. Cl. .................. 156/212; 156/213; 156/216; 264/46.4
(58) Field of Classification Search .............. 156/212, 156/213, 216, 479, 475, 267, 311; 264/46.4, 264/271.1
See application file for complete search history.

(56) References Cited

U.S. PATENT DOCUMENTS

| 5,080,742 A * | 1/1992 | Takahashi ............ 156/212 |
| 5,139,604 A * | 8/1992 | Mitchell .............. 156/479 |
| 2005/0012234 A1 | 1/2005 | Kindig et al. |

* cited by examiner

*Primary Examiner*—Jeff H Aftergut
(74) *Attorney, Agent, or Firm*—Warner Norcross & Judd

(57) ABSTRACT

A process for producing an upholstered article in a bladder mold. A cover sheet with adhesive is positioned over the opened bladder mold. A foam core is inserted into the bladder mold, carrying the cover sheet into engagement with the bladder. The bladder mold is then closed so that the bladder wraps the marginal portion of the cover sheet around the foam core. After the adhesive cures to bond the cover sheet to the foam core, the mold is opened; and the article is removed.

2 Claims, 8 Drawing Sheets

METHOD FOR MAKING CUSHIONED PRODUCT WITH INTEGRAL COVER

BACKGROUND OF THE INVENTION

The present invention relates to the manufacture of cushioned products wherein a foam core is covered with a fabric or other suitable material.

The traditional method of manufacturing an office chair seat, back, or armrest is first to mold a foam core, and second to manually apply a fabric or other suitable material over the core. The fabric is wrapped around the core, and the peripheral margin of the fabric is stapled to the underside of the core. This manufacturing process is labor intensive and produces a product that sometimes is of less than acceptable quality. In addition, the incorporation of staples into an otherwise plastic product makes the product non-recyclable.

Another process for manufacturing cushioned products involves first injection or blow-molding a PVC skin, and second back-molding the skin with a moldable foam. An injection molded PVC skin, however, has aesthetic and environmental limitations. This process has not been used successfully for cushions having fabric or other non-injection molded covers.

Yet another process for manufacturing cushioned products is illustrated in U.S. application Ser. No. 10/871,435, filed Jun. 18, 2004, entitled "Method for Making Cushioned Products with an Integral Cover" (published on Jan. 20, 2005 as Publication No. 2005/0012234). In that process, first the cover is manufactured as a semi-rigid shell, and second a foam core is injection molded into the shell. While an advance over the prior art, the search continues for processes that require less time and labor.

SUMMARY OF THE INVENTION

The aforementioned problems are overcome in the present invention in which a cushioned article is fabricated within a bladder mold. The method includes the steps of 1) opening the bladder, 2) positioning the cover sheet over the open bladder, 3) inserting a core into the bladder which also carries the cover sheet into the bladder, 4) including adhesive on at least one of the cover sheet and the core, 5) closing the bladder to wrap the marginal portion of the cover sheet around the core, 6) opening the bladder, and 7) removing the manufactured article.

The process results in products of consistent high quality. The process reduces the time and labor required to manufacture cushioned articles. The process enables the molded article to have concave surfaces because the cover sheet adheres to the core during the molding operation. The process additionally eliminates the carpal tunnel syndrome (CTS) that can result from an upholsterer continually stretching upholstery material around a core. The process also eliminates the requirement for laborers to wear hearing protection as would be required in processes requiring powered staplers. The process allows the use of "breathable fabrics" because the core is not injection molded against the back of the pattern.

In a preferred embodiment of the invention, 1) the adhesive is temperature-activated, 2) the adhesive is included on the cover sheet, and 3) the process includes the additional step of activating the adhesive before the core is inserted into the mold.

In a further preferred aspect of the invention, the sheet is precut to a desired shape and size to reduce, or even to eliminate, the requirement of trimming marginal portions of the fabric following molding.

These and other objects, advantages, and features of the invention will be more fully understood and appreciated by reference to the description of the current embodiment and the drawings.

DESCRIPTION OF THE CURRENT EMBODIMENT

Figure 1:
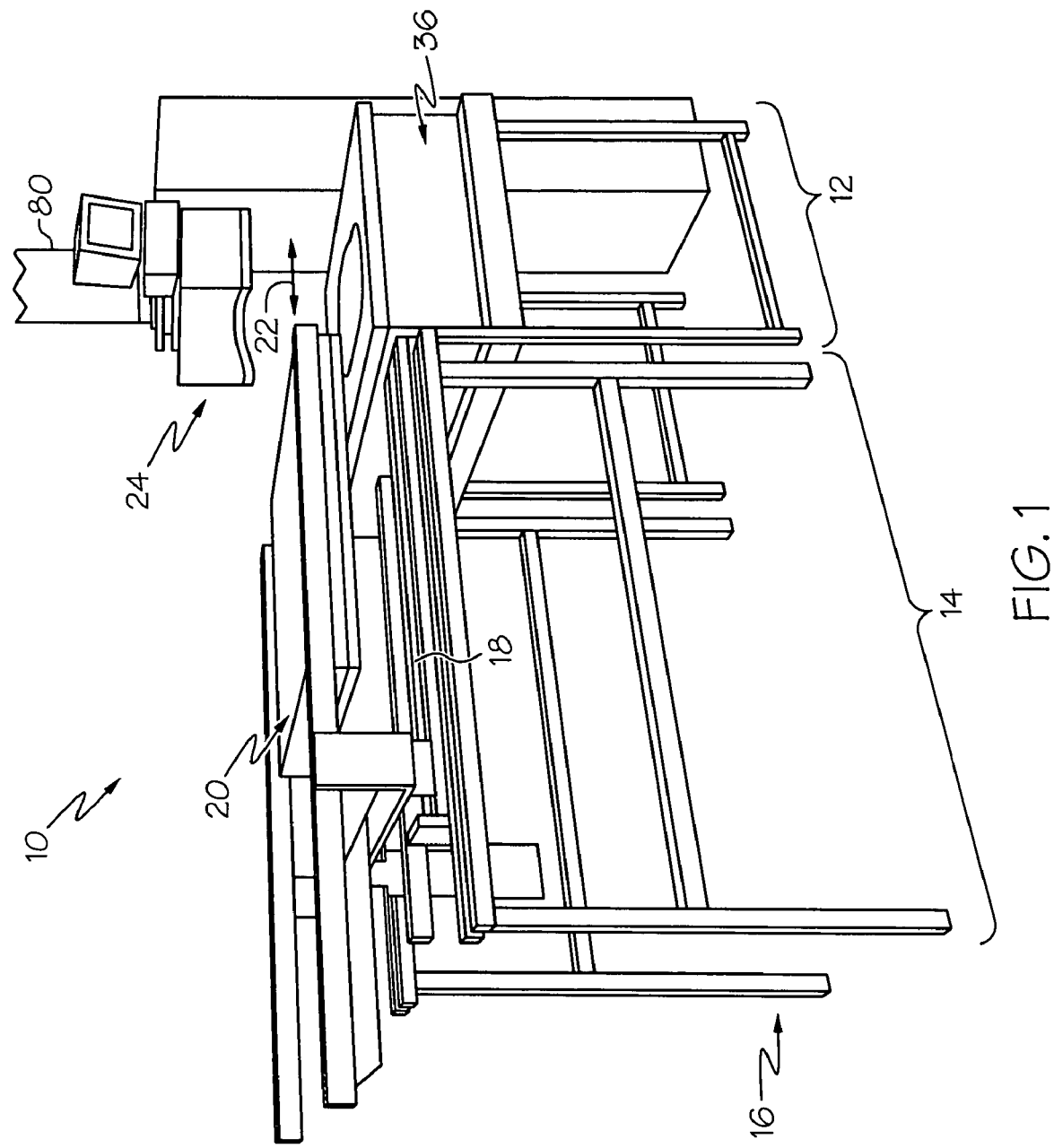
FIG. 1 is a perspective view of the molding system used in conjunction with the method of the present invention.

A system for implementing the method of the present invention is illustrated in the drawings and generally designated 10. The system includes a molding system 12 and a heating system 14. The molding system 12 is illustrated in greater detail in FIGS. 2-8. The molding system 12, but not the heating system 14 or the current process, is similar to that disclosed in U.S. application Ser. No. 10/871,435, filed Jun. 18, 2004, entitled "Method for Making Cushioned Products with an Integral Cover" (published on Jan. 20, 2005 as Publication No. 2005/0012234), the disclosure of which is incorporated by reference.

As described, the process is used to manufacture an office chair seat. However, this article is only exemplary of the wide variety of articles that can be manufactured using the process. In particular, the process can be utilized to manufacture other office chair components, automotive interior components, and other articles beyond these fields.

Figure 3:
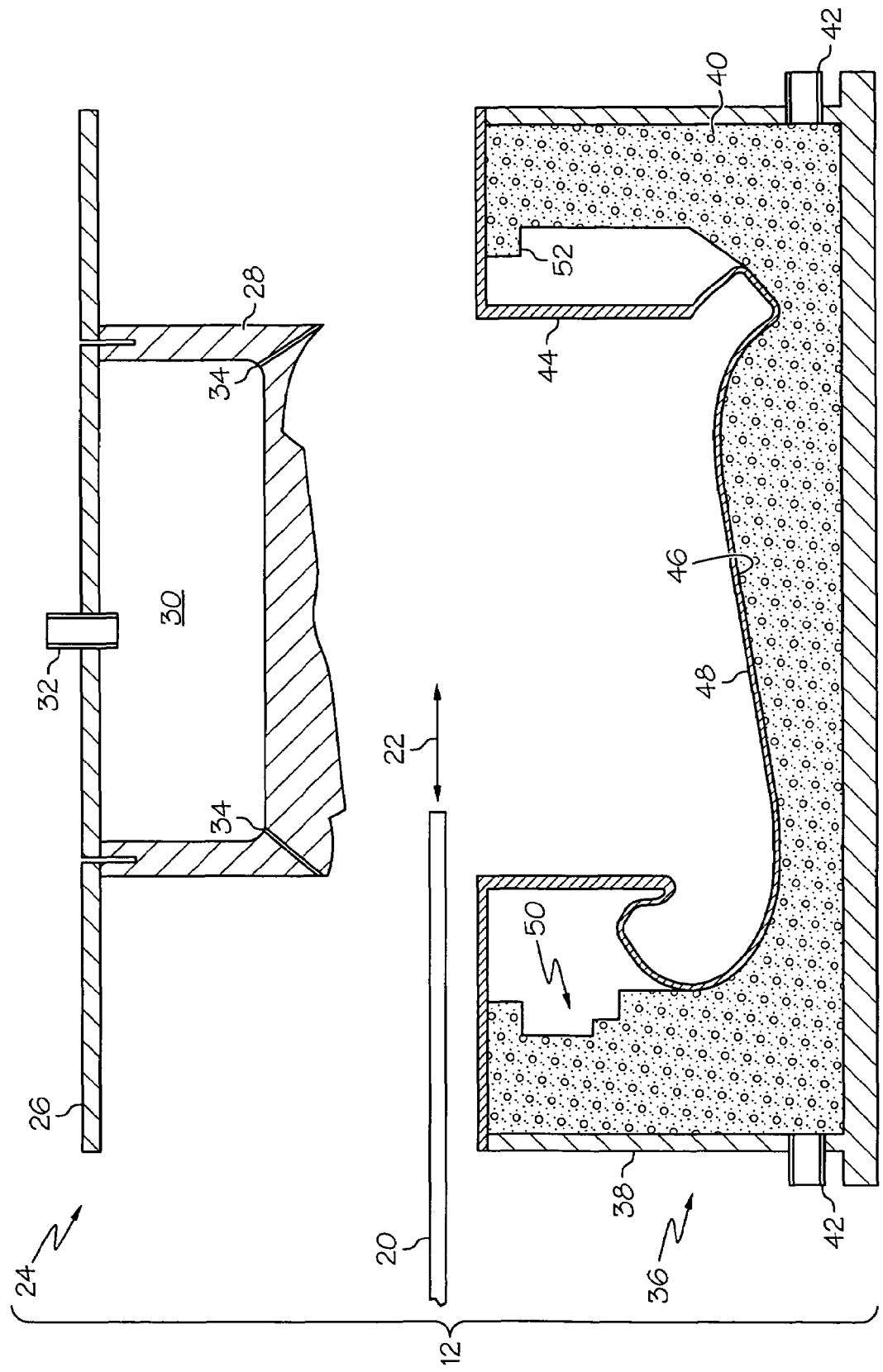
FIG. 3 is a sectional view through the bladder mold with the upper tooling withdrawn from the bladder box.

The heating assembly 14 includes a stand 16 supporting a track 18. An infrared (IR) heater bed 20 is supported on the rails 18 for horizontal translation between the withdrawn position illustrated in FIG. 1 and the heating position illustrated in FIG. 4. The heater bed 20 reciprocates in the direction indicated by the arrow 22 between the two positions. As illustrated in FIG. 3, the heater bed is shown part way between the retracted position in which the mold can be closed and the heating position over the fabric 70.

Figure 2:
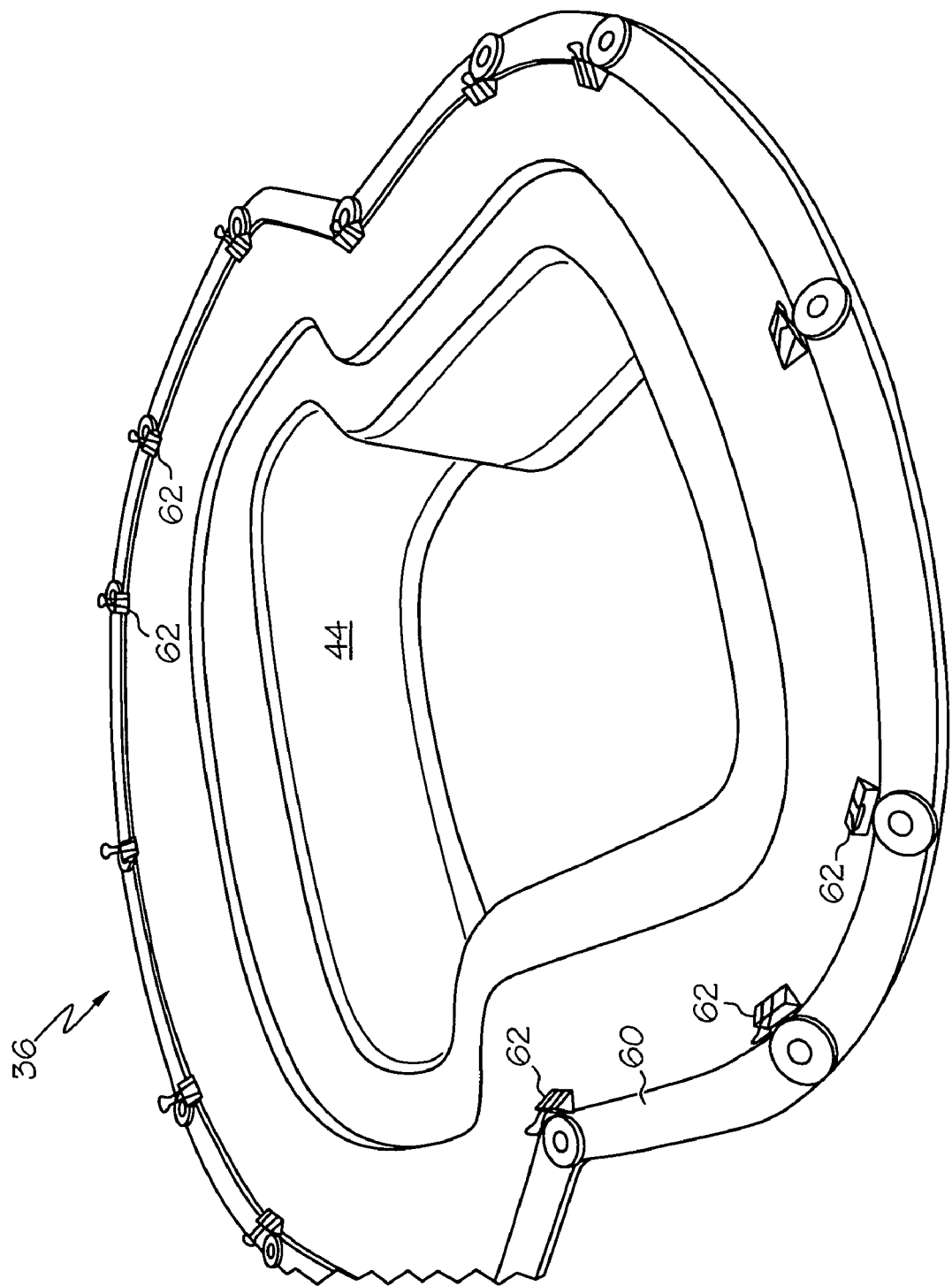
FIG. 2 is a perspective view looking down into the bladder box.

Referring initially to FIGS. 2 and 3, the upper tooling assembly 24 includes a tooling plate 26 and an upper holding tool 28. The upper assembly 24 is constructed in accordance with techniques known to those skilled in the art. A vacuum chamber 30 is defined between the tooling plate 26 and the holding tool 28. A vacuum can be drawn on the chamber through the vacuum port 32. Vacuum ports 34 communicate through the holding tool 28 from the exterior of the holding tool to the vacuum chamber 30. Although only two vacuum ports or channels 34 are visible in the sectional view, the vacuum ports are located around the entire perimeter of the tool.

The bladder mold 36 (also referred to as a lower nest) includes a bladder box 38 and a porous solid foam insert 40 located therein. Vacuum ports 42 communicate with the interior of the bladder box 38. The porous solid foam 40 is shaped to have a molding surface 46 corresponding to the desired surface of the molded article. As will be described, the present invention enables the molded article to have concave surfaces.

The bladder 44 is pre-shaped and is made to the shape of the article to be produced. The inner surface 48 of the bladder 44 corresponds to the shape and the contour of the finished product. In the preferred embodiment, the bladder is made of a cast silicone or other elastic material. As will be appreciated, the shape of the foam 40 and the bladder 44 are unique to the article being manufactured. Appropriate bladder design, material type, and durometer are selected to achieve the functions described in this application. The thickness of the bladder may be varied to make the bladder more rigid or more flexible in desired locations.

The pre-shaped cavity defined by the insert 40 includes a maze of holes (not specifically shown) that allow for a predictable and uniform vacuum within the bladder box 38. The foam 40 also defines recessed areas 50 and 52 which receive and accommodate portions of the bladder 44 when the bladder is retracted or opened.

FIG. 2 is a perspective view of the upper portion of the bladder mold 36. The bladder 44 is illustrated in its relaxed or closed position. A peripheral ring or frame 60 extends around the entire perimeter of the upper portion of the bladder mold 36. A plurality of clips 62 are attached to the frame at spaced locations around the frame to clampingly receive the fabric as will be described. Currently, the fabric must be manually positioned within the clips 62. It is contemplated that the clamping process can be automated, for example, using a mechanical transfer device or a programmable robot. The selection of the number of clips and the clamping forces of the clips will be selected in accordance with other process parameters to provide a desired release of the fabric during the manufacturing process.

In the current embodiment, the bladder box 36 remains stationary, and the upper tool assembly 28 reciprocates vertically. The upper tool assembly is operated by a pneumatic or hydraulic low-tonnage press 80 (see FIG. 1) in accordance with techniques generally well-known to those skilled in the art.

Figure 4:
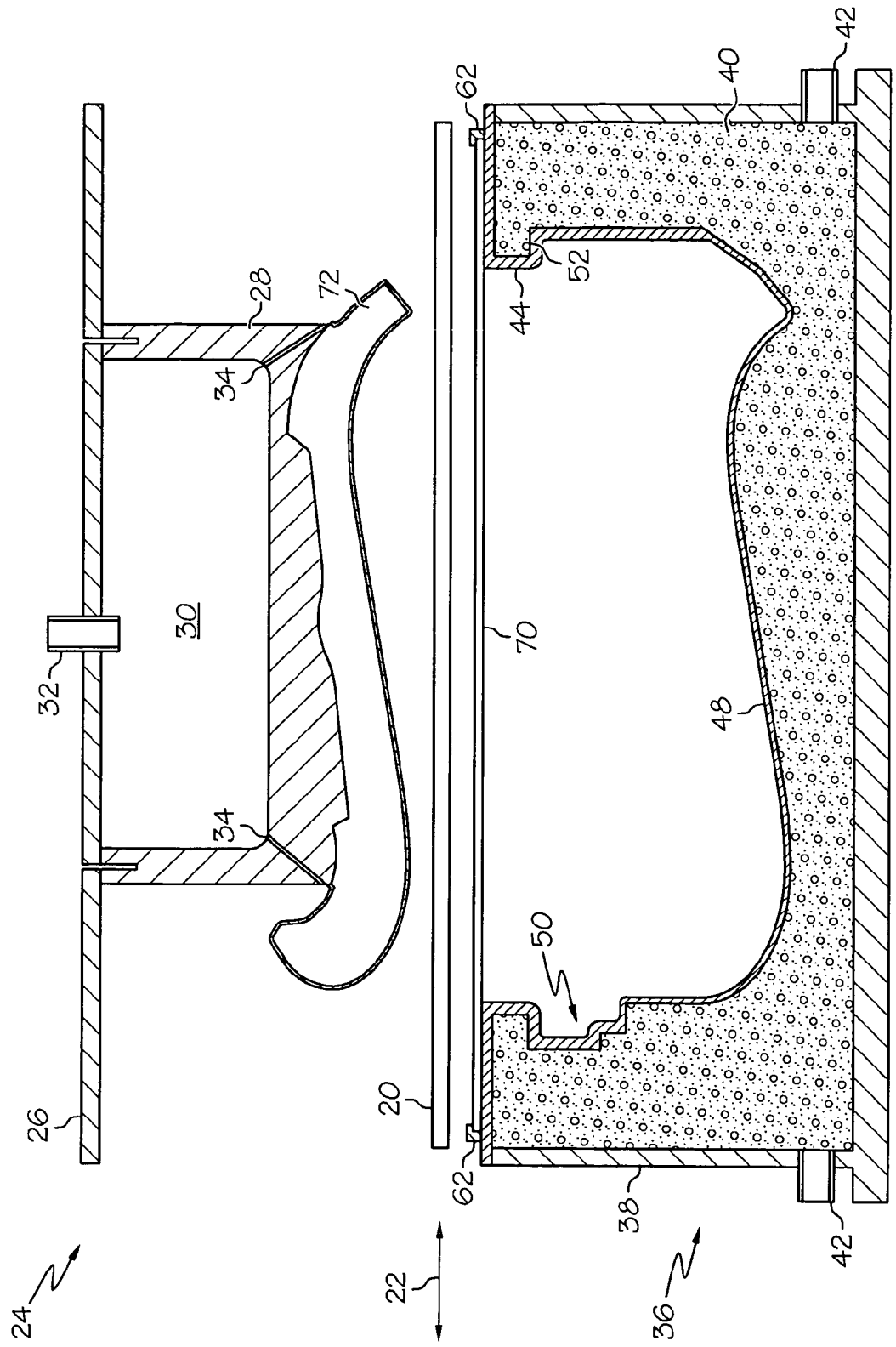
FIG. 4 is a sectional view of the mold with the fabric in position over the bladder, with the foam core or cushion mounted on the tool holder, and with the bladder retracted or opened.

In FIG. 4, the fabric 70 is mounted on the bladder mold 36; and the foam core 72 is mounted on the upper holding tool 28. The marginal portions of the fabric 70 are secured in the clips 62 to hold the fabric in a horizontal position over the opening of the bladder mold.

Preferably, the sheet 70 is cut to shape for each particular product configuration before the sheet is mounted on the bladder mold. The material can be one of many types including but not limited to fabrics of various weaves and materials, vinyls, TPUs (thermoplastic urethanes), and leathers. For some types of materials, heat improves the pliability of the fabric.

The fabric 70 is coated on its upper surface (i.e. the surface which will engage the foam core 72) with an adhesive. The adhesive in the current embodiment is heat-activated or temperature-activated. Other suitable adhesives include pressure-sensitive adhesive, and those that can be sprayed on or gunned on prior to molding.

The foam core 72 is snapped onto or otherwise mounted on the upper tool holder 28. In the current embodiment, the core 72 includes a T-slot hole to facilitate the attachments. Further in the current embodiment, the foam core is a soft urethane cushion. Other suitable materials will be known to those skilled in the art. The core may have both rigid and non-rigid portions. The rigid portions may be included, for example, to attach the seat to the office chair frame. As previously noted, the core 72 is the core for an office chair seat.

Also in FIG. 4, the heater bed 20 is shown in its heating position over the sheet 70. The infrared heaters (not specifically shown) within the heater bed are activated when the bed is in the heating position to raise the temperature of the sheet 70 and more specifically the temperature-activated adhesive carried thereon. Depending on the material of which the sheet 70 is fabricated, heating also can improve the pliability of the sheet. Because the sheet 70 currently is a fabric, this specification uses the terms sheet and fabric interchangeably.

After the fabric 70 has been heated a desired amount, the infrared heater bed 20 is moved to its retracted position (see FIG. 1), and therefore is not visible in FIGS. 5-8.

Continuing with FIG. 4, the bladder 44 is retracted or open. The bladder is retracted by applying a vacuum to the ports 42 which draws a vacuum through the porous insert 40. Portions of the bladder fit into the recesses 50 and 52 when the bladder is in the retracted or draw-back position to receive the core 72 and sheet 70.

Figure 5:
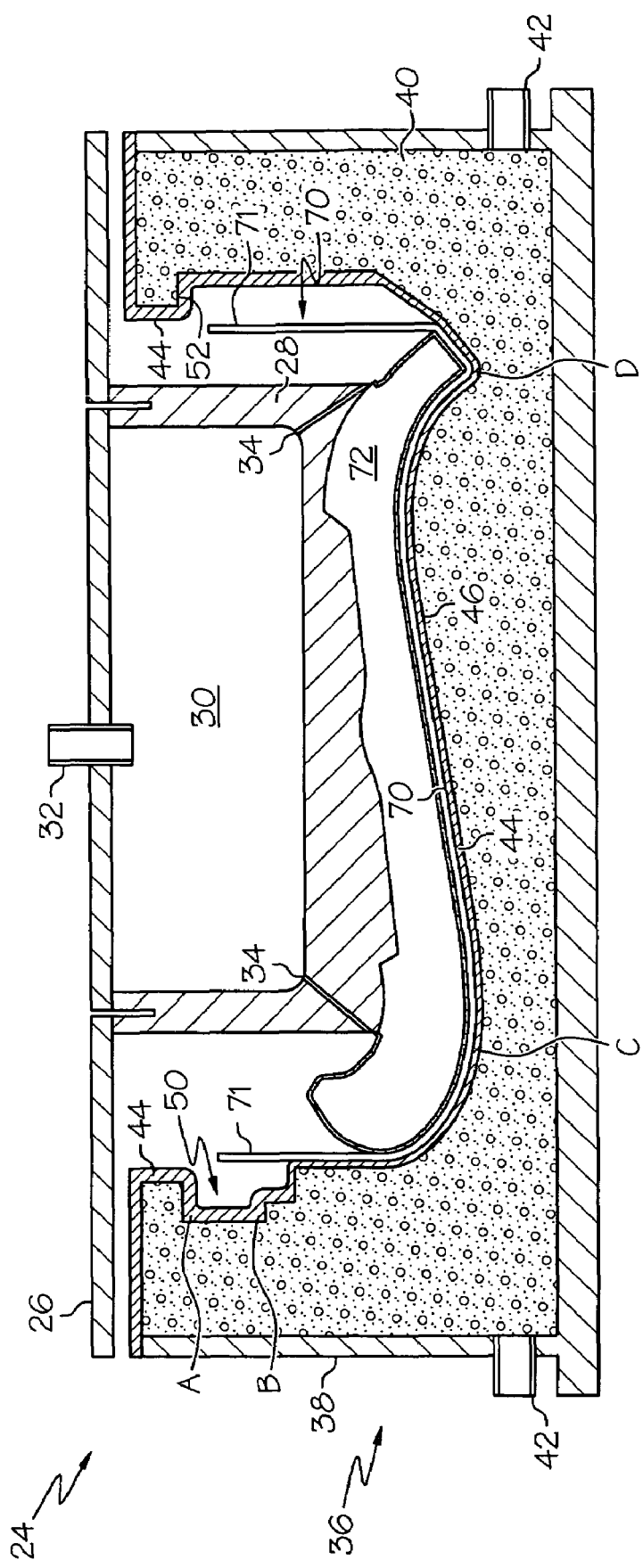
FIG. 5 is a sectional view showing the fabric and core fully inserted into the mold.

FIG. 5 illustrates the next step in the manufacturing process in which the upper tool holder 28 has been moved from its upper or retracted position (shown in FIG. 4) to its lower position. As the upper tool holder is lowered, the foam core 72 first engages the fabric 70. As the upper tool holder continues to lower, the fabric is pulled from the clips 62 to move with the foam core into the bladder mold 36. The upper tool holder 28 continues to move downwardly until the fabric 70 and the foam core 72 are in firm engagement with the bladder 44 laying against the porous insert 40. The bladder and porous material ensure that the fabric 70 is pushed firmly against the foam core 72 along the entire lower contour of the foam core. This ensures that the fabric is tightly bonded to the foam core in concave surfaces (e.g. the surface between C and D) as well as flat and convex surfaces. It should be noted that the bladder 44 is sized to closely receive the fabric and the foam core 72. This close fit is important in obtaining a good wrap of the fabric 70 about the foam core 72. With the product in complete contact with the surface of the bladder box liner 40, the downward travel stops.

Figure 6:
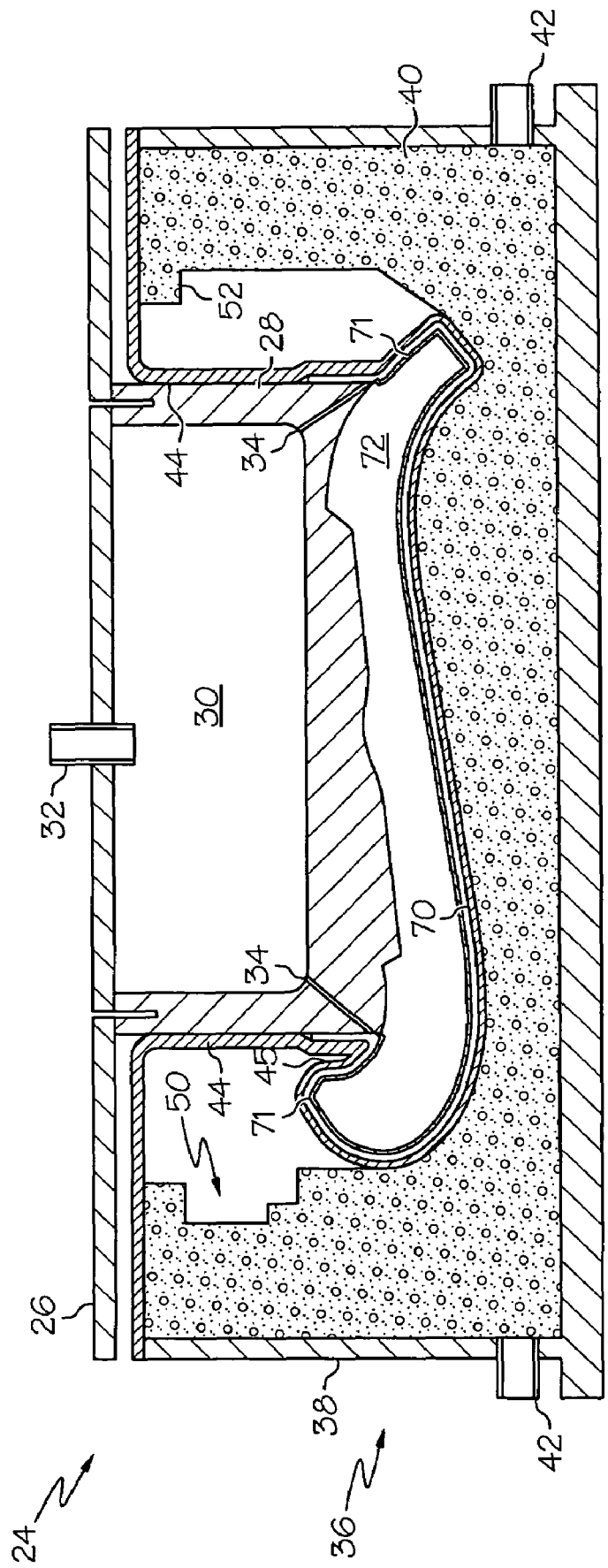
FIG. 6 is a section view showing the bladder released or closed to wrap the fabric around the core.

At this point, the vacuum applied to the port 42 is released; and a vacuum is applied to the port 32 to result in the configuration illustrated in FIG. 6. The released bladder 44 wraps, draws, and/or forms the marginal portion 71 of the material 70 around the foam core 72. More specifically, the released vacuum on ports 42 permits the bladder to return to its natural shape as illustrated in FIGS. 3 and 6. Additionally, the vacuum drawn through the ports 34 assists in pulling the bladder 44 and specifically the portion 45 into firm contact with the upper portion of the film core 72. Optionally, pressure may be applied to the ports 42 to accelerate the movement of the bladder or to otherwise assist the bladder's movement and function. Optionally, the upper tooling 24 is given short lifting cycles to enhance movement of the bladder 44 across the top of the core 72. After the wrapping is complete and after sufficient curing time for the adhesive has elapsed, the vacuum to the port 32 is released. At this point, the strength of the pre-shaped bladder holds the fabric 70 to the foam core 72 in a static state. Additionally, a mechanical attachment (not shown) such as "sharks teeth" can be included on the core 72 to assist in retaining the marginal portion 71 of the sheet 70 to the core. Such a mechanical attachment could either supplement the described adhesive or replace the described adhesive. If the adhesive is omitted, further securement (e.g. using staples or other fasteners) of the marginal portion 71 to the core 72 after the article is removed from the mold may be desirable.

Figure 7:
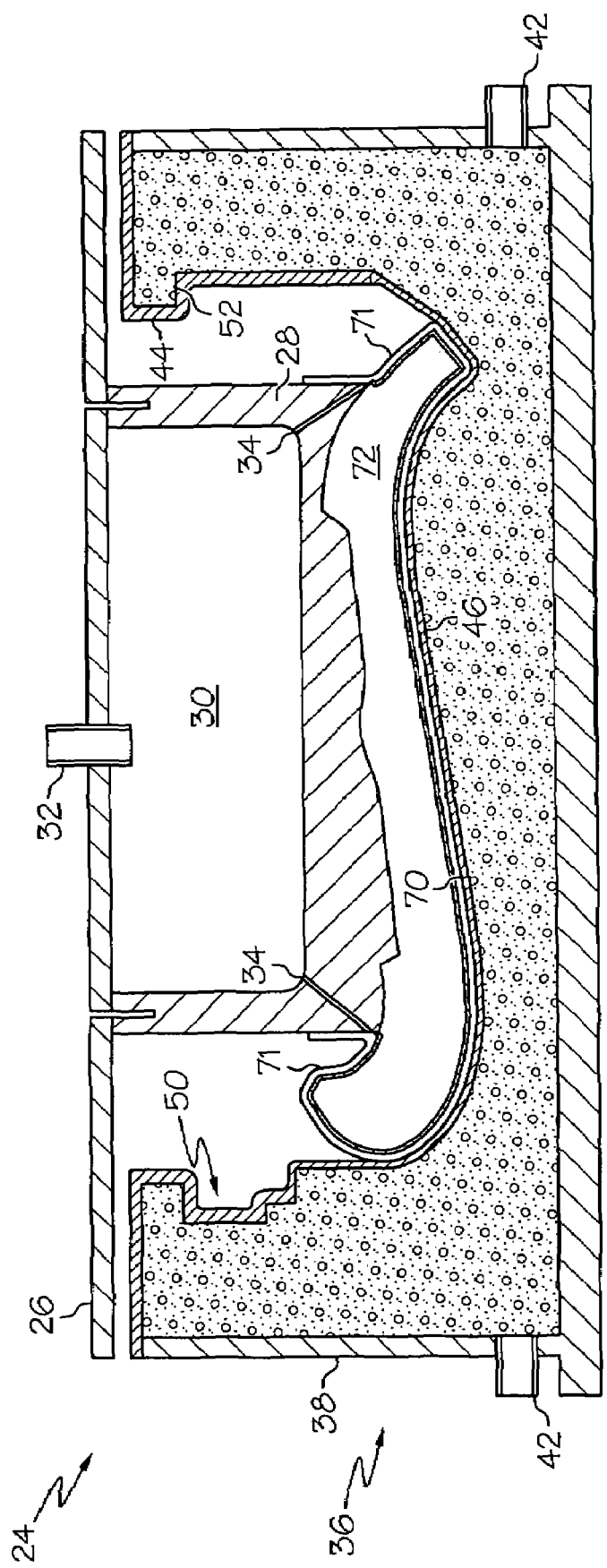
FIG. 7 is a sectional view showing the bladder retracted or opened following molding.

After the appropriate amount of curing time for the particular adhesive and/or materials, the bladder is retracted or drawn back by applying a vacuum to port 42, resulting in the configuration illustrated in FIG. 7. The fabric 70, which is now adhered to the foam core 72 stays in position even after the bladder is opened.

Figure 8:
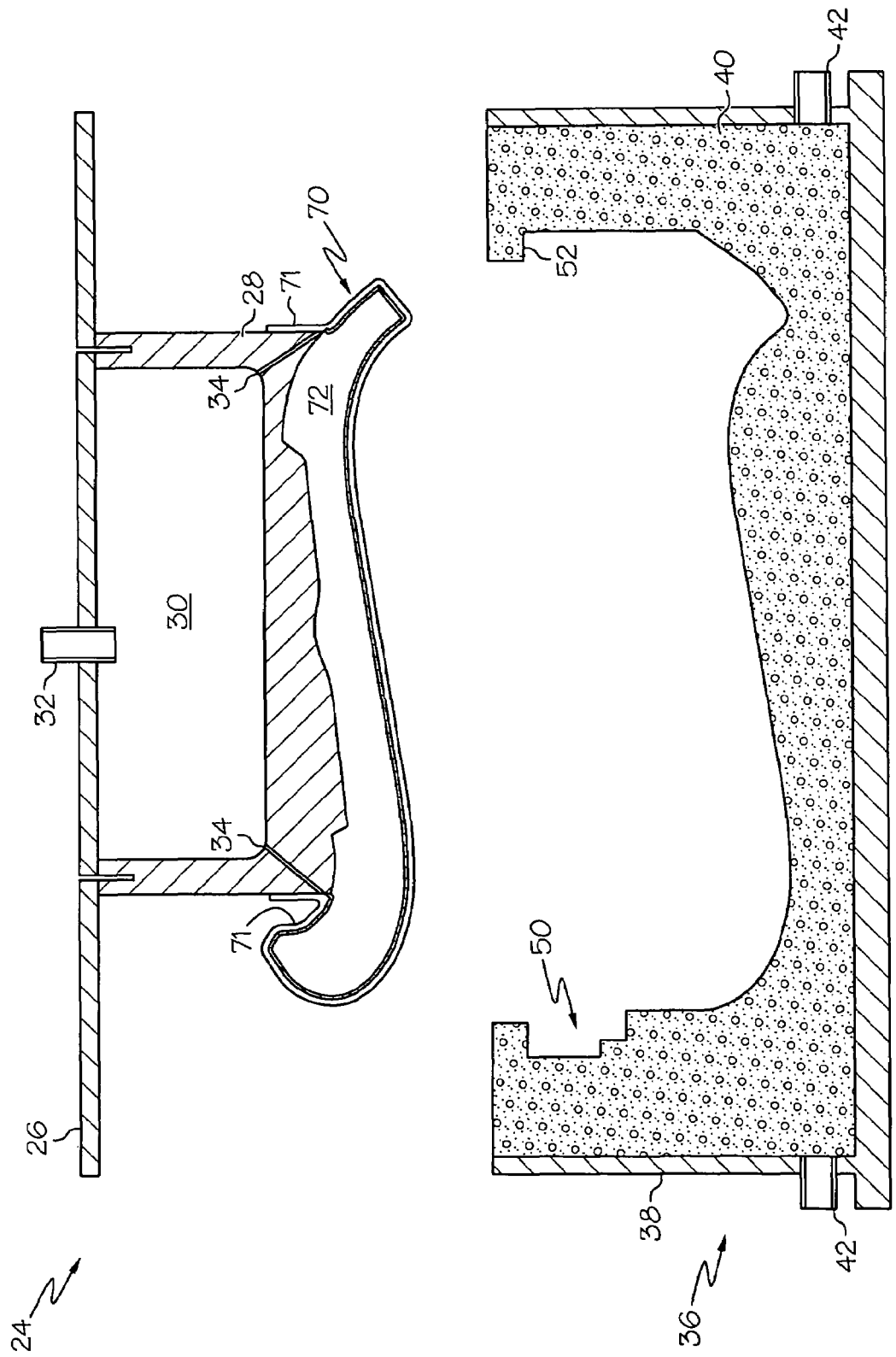
FIG. 8 is a sectional view showing the molded article withdrawn from the bladder box.

Finally, as illustrated in FIG. 8, the upper tooling 24 is raised to withdraw the upholstered article from the bladder mold 36. When in this position, the foam core 72 can be unsnapped or otherwise detached from the upper holding tool 28. With the previously described optionally pre-cutting of the fabric 70, subsequent trimming operations should not be required. However, any required trimming is performed after the article is withdrawn from the mold. At this point, the tooling and related equipment is in the original position as illustrated in FIG. 3 so that the cycle can be repeated.

The described method enables the efficient, effective, and rapid production of upholstered articles. The fabric 70 is attached to all concave surfaces on the core 72; and the fabric is wrapped about and retained in position on the underside of the core 72 (as viewed in the assembled article).

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method of producing an upholstered article having a core and an integral cover comprising the steps of:
   retracting a bladder;
   placing a sheet of cover material over the retracted bladder;
   moving a foam core into the retracted bladder, the foam core engaging the sheet and carrying the sheet into contact with the bladder;
   releasing the bladder, the released bladder engaging a marginal portion of the sheet and wrapping the marginal portion around the core;
   securing the sheet to the core;
   retracting the bladder;
   removing the formed article from the bladder; and
   supporting the bladder with a porous rigid foam.

2. A method of producing a cushioned article comprising the steps of:
   activating as necessary adhesive on a cover sheet;
   placing the cover sheet over a bladder;
   opening the bladder;
   inserting a foam core into the bladder, the foam core engaging a central portion of the cover sheet during the inserting step and forcing the central portion of the cover sheet into contact with the bladder;
   closing the bladder, the bladder engaging a marginal portion of the cover sheet during the closing step and wrapping the marginal portion of the cover sheet about a portion of the foam core;
   allowing the adhesive to cure as necessary;
   opening the bladder;
   removing the article from the bladder; and
   supporting the bladder with a rigid porous foam.

* * * * *